United States Patent [19]

Hewitt

[11] 4,456,333

[45] Jun. 26, 1984

[54] SIDE VIEW MIRROR FOR VEHICLES

[76] Inventor: Delbert C. Hewitt, P.O. Box 365, Wilsonville, Oreg. 97070

[21] Appl. No.: 358,520

[22] Filed: Mar. 15, 1982

[51] Int. Cl.³ .............................. G02B 7/18; G02B 5/08
[52] U.S. Cl. ..................................................... 350/289
[58] Field of Search ......................................... 350/289

[56] References Cited

U.S. PATENT DOCUMENTS

| 2,877,686 | 3/1959 | Foster | 350/289 |
| 4,134,646 | 2/1979 | Petterborg et al. | 350/289 |
| 4,190,326 | 2/1980 | Brodbeck | 350/289 |
| 4,295,708 | 10/1981 | Albrecht et al. | 350/289 |

Primary Examiner—Jon W. Henry
Attorney, Agent, or Firm—Eugene M. Eckelman

[57] ABSTRACT

A mirror frame is pivotally supported on an upright shaft arranged to have an integral, non-rotatable securement to mirror bracket arms of a vehicle. The upright shaft has a radially projecting arm with threaded connection to a cross shaft driven by a reversible motor supported on such shaft. The end of the cross shaft opposite from its drive connection with the upright shaft has a rotatable support at a laterally offset point on the mirror frame to provide rotation of the mirror frame relative to the upright shaft upon operation of the motor. The bearing connection of the cross shaft with the mirror frame is one which allows adjustment about a vertical axis but one which prevents axial movement of the shaft.

5 Claims, 2 Drawing Figures

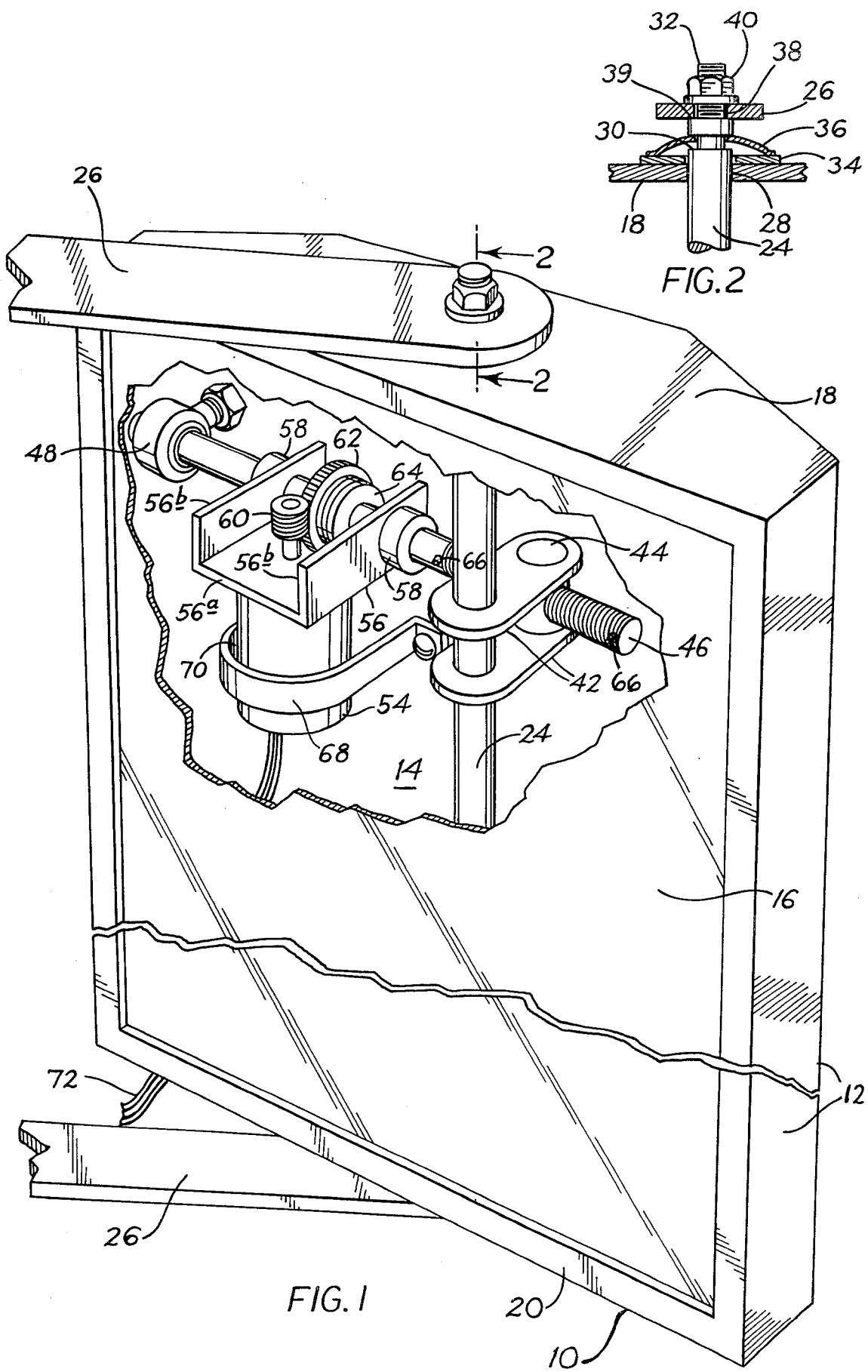

SIDE VIEW MIRROR FOR VEHICLES

BACKGROUND OF THE INVENTION

This invention relates to new and useful improvements in side view mirrors for vehicles and is particularly concerned with a power adjustable side view mirror that can be controlled from a remote area such as from within the vehicle.

Attempts have heretofore been made to provide power adjusting means for side view mirrors for vehicles but such mirror assemblies do not appear to have been commercially feasible in view of their absence from the market. It is the contention of applicant that market response to previous power adjust mirrors is due to inherent disadvantages in their structures. One such disadvantage is in the high cost of manufacture and in the bulkiness of the mirror. Another disadvantage is that since the mirrors must be adjustable, it is difficult to provide a vibration free adjustable connection with the vehicle. Such vibration results in fast wear of the parts and also makes it difficult for the driver to view to the rear.

SUMMARY OF THE INVENTION

According to the present invention and forming a primary objective thereof, a side view mirror for vehicles is provided which has power adjustment in an arrangement which is simplified in structure and substantially vibration free in its attachment to the vehicle.

In carrying out these objectives, the invention employs an upright frame having a mirror on the front thereof. The frame has upright shaft means which pivotally support said frame, and securing means are provided on the shaft means which are arranged to secure the latter non-rotatably to supporting mirror brackets of a vehicle. The shaft means has a radially projecting lever arm, with threaded connection to a cross shaft operated by a reversible drive motor suspended from the shaft. The cross shaft is secured to the frame at one of its ends in a rotatable but axially stationary arrangement. Since the upright shaft means has non-rotatable connection on supporting mirror brackets of a vehicle and since the mirror frame is pivotally supported on such shaft means, operation of the motor turns the frame relative to the upright shaft means. Operation of the motor can be controlled from a remote area such as from within the vehicle for easy adjustment of the mirror. By means of the stationary securement of the cross shaft to the mirror frame in an axial direction, the mirror frame is held against vibration.

The invention will be better understood and additional objects and advantages will become apparent from the following description taken in connection with the accompanying drawings.

BRIEF DESCRIPTION OF THE DRAWINGS

FIG. 1 is a foreshortened perspective view of a side view mirror embodying features of the invention, this view being partly broken away to show operating structure; and FIG. 2 is a fragmentary sectional view taken on the line 2—2 of FIG. 1.

DETAILED DESCRIPTION OF A PREFERRED EMBODIMENT

With particular reference to the drawings, the numeral 10 designates a mirror frame or housing having side walls 12, a rear wall 14, a front wall 16 consisting of a mirror, a top wall or portion 18, and a bottom wall or portion 20. These walls are secured together or fabricated in a suitable and well known manner. It is preferred that the mirror frame 10 having substantially a weather tight interior for enclosing operating structure.

A shaft 24 extends upward through the interior of the mirror frame and projects through the top and bottom walls of such frame. Important to the invention, this shaft or rod is arranged to have integral, non-rotatable connection to the usual mirror brackets 26 of the vehicle. For this purpose, and with particular reference to FIG. 2, the top and bottom walls 18 and 20 of the mirror frame have apertures 28 through which the shaft 24 projects. These apertures have a selected diameter so as to fit snugly around the shaft 24 but at the same time to allow rotative movement of the mirror frame around the shaft. The connections to the top and bottom brackets are identical, with FIG. 2 showing the details of such connections.

Shaft 24 has notches 30 and reduced diameter threaded end portions 32. Washers 34 are mounted on the shaft 24 and bear against the end surfaces of the mirror housing. Vertical confinement of the mirror frame on the shaft is provided by spring clips 36 which bear against the washers and lock in the notches 30. It is desired that the dimensions be such that the washers 34 provide a clamping effect against the top and bottom surfaces of the mirror frame so that there will be no appreciable slack which could cause vibration, and to construct the said frame from a plastic such as nylon to provide a reduced friction bearing surface with the washers. By such arrangement, a snug vertical connection is provided and yet rotative adjustment can be made as will be described.

The mirror brackets 26 have apertures 38 which receive the ends of the shaft 24 and these brackets engage shoulders 39 formed by the reduced ends 32.

Nuts 40 are secured on the threaded projections 32 and are securely tightened so that they firmly clamp the bracket arms against shoulders 39 in an integral and non-rotatable securement of the shaft 24 to the bracket arms 26.

Upright shaft 24 has a pair of integral radially extending lever arms 42 rotatably supporting an upright nut 44 therebetween. One end of a cross shaft 46 has threaded engagement in the nut 44, and the other end of shaft 46 is supported in a bearing 48 secured to a laterally offcenter point on the rear wall 14 of the mirror frame 10. Bearing 48 is of a structure which allows rotative movement of the shaft as well as some pivotal movement about a vertical axis but which prevents axial movement of the shaft 46.

A reversible drive motor 54, such as an electric motor, is suspended from the shaft 46 by means of a U-shaped bracket 56 having its body portion 56a integral with the motor housing and having its leg portions 56b supported at spaced points on the shaft 46. The shaft 46 has free rotation in the bracket 56 and the latter is anchored longitudinally on such shaft by collars 58. The output shaft of the motor 54 has a worm gear 60 secured thereto, and such worm gear has meshing engagement with a gear 62 secured to the shaft 46 by means of a slip clutch 64. Clutch 64 is arranged to allow the gear 62 to slip relative to the shaft 46 at the limits of pivotal adjusting travel of the mirror on the shaft 24 to prevent damage to the motor in the event that the mirror is caused to operate past the limit positions of rotation. This clutch will also allow the gear 62 to slip on the shaft should the mirror accidentally jam. Stops 66 are provided at the opposite ends of the threads on shaft 46 to prevent the shaft from disengaging from nut 44.

Motor 54 is anchored to the rear wall 14 by strap means 64 so that it can apply the driving force. With particular reference to FIG. 1, the strap means 68 is slightly larger than the motor housing. Such enlargement forms a space 70 between the strap and the motor to allow some shifting of the motor that may be necessary relative to the rear wall during adjustment of the mirror frame relative to the shaft 46.

Motor 54 has a power operating connection 72, such as electric wires, to a source of power, not shown, and to a remote control switch, also not shown, preferably located in the vehicle for easy access to the driver.

When it is desired to adjust the mirror on its vertical axis to change the angle of rear viewing, the driver operates the motor 54 in the desired direction. Upon operation of the motor 54, cross shaft 46 operating in the nut 44 causes rotation of the mirror frame 10 relative to the upright shaft 24. Since there is a positive lateral connection of the cross shaft 46 in the nut 44 and in the rod end bearing 48 and since the upright shaft 24 is secured non-rotatably to the mirror holding brackets 26, the mirror frame 10 will adjust in a substantially vibration free arrangement. Also, since the motor 54 has an adjustable connection with the frame by means of the enlarged strap 68, it can adjust automatically to any change of angle that may occur in the shaft 46 as a result of rotative adjustment.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A side view mirror for vehicles of the type arranged to be attached to supporting brackets on the vehicle, comprising (a) an upright mirror housing having a rear wall portion, top and bottom wall portions, and a mirror on the front thereof,
    (b) upright rod means in said housing projecting through said top and bottom wall portions,
    (c) support means on said rod means pivotally supporting said housing on said rod means,
    (d) securing means on said rod means arranged to secure said rod means non-rotatably on the supporting brackets of a vehicle,
    (e) a radially projecting arm secured integrally to said rod means between the ends of the latter,
    (f) a cross shaft in said housing,
    (g) bearing means secured to said housing and supporting one end of said shaft,
    (h) threaded connecting means connecting said shaft to said radially projecting arm and providing support for the other end of said shaft,
    (i) reversible drive motor means in said housing having a rotatable output,
    (j) and drive connecting means connecting said rotatable output of said motor to said arm on said rod means whereby upon operation of said motor it is arranged to rotate said frame relative to said rod means to provide adjustment of the mirror.

2. The side view mirror of claim 1 wherein said bearing means supports said one end of said cross shaft for rotation of the latter but holds said shaft securely against axial movement whereby to maintain said housing against lateral vibration.

3. The side view mirror of claim 2 wherein said drive motor means is supported on said cross shaft.

4. The side view mirror of claim 2 wherein said drive motor means is supported on said cross shaft, and a slip clutch in said drive connecting means providing overrunning operation of said drive motor means in both directions.

5. The side view mirror of claim 2 wherein said drive motor means is supported on said cross shaft but has adjustable anchored connection to said housing to accommodate oblique movement of said drive motor means in drive adjustments of said mirror.

* * * * *